United States Patent
Kitagawa et al.

(10) Patent No.: US 8,310,809 B2
(45) Date of Patent: Nov. 13, 2012

(54) ELECTRIC DOUBLE LAYER CAPACITOR AND METHOD FOR MANUFACTURING SAME

(75) Inventors: Toshiyuki Kitagawa, Kyoto (JP); Toshitaka Hibi, Kyoto (JP); Kouji Tsuyuki, Kyoto (JP); Sayori Hirose, Kyoto (JP); Toshiharu Hirata, Kyoto (JP); Keiko Hashimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 631 days.

(21) Appl. No.: 12/161,744

(22) PCT Filed: Mar. 12, 2007

(86) PCT No.: PCT/JP2007/054768
§ 371 (c)(1),
(2), (4) Date: Jul. 22, 2008

(87) PCT Pub. No.: WO2007/122894
PCT Pub. Date: Nov. 1, 2007

(65) Prior Publication Data
US 2010/0226068 A1    Sep. 9, 2010

(30) Foreign Application Priority Data

Mar. 23, 2006  (JP) ................ 2006-080282
Mar. 23, 2006  (JP) ................ 2006-080283
Mar. 23, 2006  (JP) ................ 2006-080284

(51) Int. Cl.
*H01G 9/00*  (2006.01)
(52) U.S. Cl. ...................................... 361/502
(58) Field of Classification Search ........... 361/502
See application file for complete search history.

(56) References Cited

U.S. PATENT DOCUMENTS

| | | | | |
|---|---|---|---|---|
| 5,736,270 A | * | 4/1998 | Suzuki et al. | 429/94 |
| 6,071,638 A | * | 6/2000 | Fradin | 429/94 |
| 6,222,720 B1 | * | 4/2001 | Aoki et al. | 361/301.5 |
| 6,328,769 B1 | * | 12/2001 | Oweis et al. | 29/623.1 |

(Continued)

FOREIGN PATENT DOCUMENTS

| | | | |
|---|---|---|---|
| JP | 04354317 A | * | 12/1992 |
| JP | 2000-124086 | | 4/2000 |
| JP | 2000260417 A | * | 9/2000 |

(Continued)

OTHER PUBLICATIONS

International Search Report issued May 29, 2007 in the International (PCT) Application of which the present application is the U.S. National Stage.

*Primary Examiner* — David M Sinclair
(74) *Attorney, Agent, or Firm* — Wenderoth, Lind & Ponack, L.L.P.

(57) ABSTRACT

An electric double-layer capacitor includes a cylindrical case having a bottom, a side surface, and an opening, a capacitor element accommodated in the case, the capacitor element, a driving electrolyte accommodated in the case, and a terminal plate provided at the opening of the case. The capacitor element includes a first electrode and a second electrode extending in a direction opposite to the first electrode. The second electrode is joined to the bottom of the case. The first and second electrodes are tilted away from the center axis of the capacitor element. In this electric double-layer capacitor, electrodes of the capacitor element are connected to the case and sealing plate reliably.

32 Claims, 11 Drawing Sheets

U.S. PATENT DOCUMENTS

| | | | |
|---|---|---|---|
| 7,364,817 B2 * | 4/2008 | Lee | 429/161 |
| 7,618,742 B2 * | 11/2009 | Kaplin et al. | 429/130 |
| 7,670,715 B2 * | 3/2010 | Schubert | 429/121 |
| 7,678,501 B2 * | 3/2010 | Tomihara et al. | 429/211 |
| 7,700,222 B2 * | 4/2010 | Kozuki | 429/94 |
| 2002/0164524 A1 | 11/2002 | Yashiro et al. | |
| 2003/0118912 A1 * | 6/2003 | Watanabe et al. | 429/326 |
| 2005/0225926 A1 | 10/2005 | Erhardt et al. | |

FOREIGN PATENT DOCUMENTS

| | | |
|---|---|---|
| JP | 2002-075319 | 3/2002 |
| JP | 2003-022842 | 1/2003 |
| JP | 2004-134632 | 4/2004 |
| JP | 2005-520344 | 7/2005 |
| JP | 2006-004729 | 1/2006 |
| WO | 03/079464 | 9/2003 |

* cited by examiner

ELECTRIC DOUBLE LAYER CAPACITOR AND METHOD FOR MANUFACTURING SAME

BACKGROUND OF THE INVENTION (1) Field of the Invention

The present invention relates to a method of manufacturing an electric double-layer capacitor that is used for regeneration or power storage of various electronic devices and hybrid vehicles.

(2) Description of Related Art

FIG. 9 is a sectional view of a conventional electric double-layer capacitor 501 disclosed in patent document 1. Hollow portion 10A is provided in capacitor element 10. A polarizable electrode layer is formed on each of two collectors made of aluminum foil having a strip shape. Positive electrode 15A is disposed on one end side in the width direction of one collector. Negative electrode 15B is disposed at an end of the other collector in the opposite direction to positive electrode 15A. A separator is provided between the collectors. The collectors and the separator are wound around hollow portion 10A, providing capacitor element 10. Electrodes 15A and 15B are exposed at end surfaces of capacitor element 10 opposite to each other.

Cylindrical case 11 having a bottom, made of metal, such as aluminum, accommodates capacitor element 10 and a driving electrolyte. Negative electrode terminal 11A for external connection is provided unitarily on an outer bottom surface of case 11. Projection 11B is provided unitarily on an inner bottom surface of case 11, and is inserted into hollow portion 10A of capacitor element 10. Negative electrode 15B of capacitor element 10 accommodated in the case 11 is joined mechanically and electrically to the inner bottom surface of case 11 by laser welding.

Positive electrode terminal 12A for external connection is provided unitarily on an outer surface of sealing plate 12 made of aluminum. Projection 12B is inserted into hollow portion 10A of capacitor element 10. The driving electrolyte is put into case 11 through injection port 12C. Pressure regulating valve 13 regulates the pressure in case 11. Positive electrode 15A of capacitor element 10 is joined mechanically and electrically to an inner surface of sealing plate 12 by, for example, laser welding. An opening edge of case 11 is wound with a periphery of sealing plate 12, thereby being sealed with sealing plate 12, which is called a curling process.

In electric double-layer capacitor 501, electrodes 15A and 15B provided on both end surfaces of capacitor element 10 are joined directly to case 11 and sealing plate 12 with small connection resistances, respectively.

FIG. 10 is an enlarged sectional view of capacitor element 10. Electrodes 15A and 15B exposed at both end surfaces of capacitor element 10 are provided at low density because only respective ones of the electrodes are exposed at respective ones of both end surfaces. The low density prevents electrodes 15A and 15B from being pressed stably on and being welded to case 11 and sealing plate 12.

This welding is performed by radiating a laser beam from the outer bottom surface of case 11 and the outer surface of sealing plate 12 while the inner bottom surface of case 11 and the inner surface of sealing plate 12 are pressed on electrodes 15A and 15B. This operation prevents electrodes 15A and 15B from melting enough to be welded.

In order to weld case 11 and sealing plate 12 to electrodes 15A and 15B reliably, projections are provided on the inner bottom surface of case 11 and the inner surface of sealing plate 12. Electrodes 15A and 15B are welded with a laser by pressing the projections onto electrodes 15A and 15B. However, only portions of the electrodes on which the projections are pressed may be welded reliably, but other portions cannot be welded stably.

In electric double-layer capacitor 501, electrodes 15A and 15B are welded to the inner bottom surface of case 11 and the inner surface of sealing plate 12 with the laser, thereby joining capacitor element 10 mechanically and electrically to case 11 and sealing plate 12. Upon being used for vehicles, electric double-layer capacitor 501 is required to withstand large vibrations.

In electric double-layer capacitor 501, a gap is provided between an outer circumferential surface of capacitor element 10 and an inner surface of case 11. When large vibration is applied to electric double-layer capacitor 501, capacitor element 10 moves in case 11. This applies a stress to joined portions between electrodes 15A and 15B and case 11 and sealing plate 12, which can cause the joined portions to break.

Patent document 1: Japanese Patent Laid-Open Publication No. 2004-134632

BRIEF SUMMARY OF THE INVENTION

An electric double-layer capacitor includes a cylindrical case having a bottom, a side surface, and an opening, a capacitor element accommodated in the case, the capacitor element, a driving electrolyte accommodated in the case, and a terminal plate provided at the opening of the case. The capacitor element includes a first electrode and a second electrode extending in a direction opposite to the first electrode. The second electrode is joined to the bottom of the case. The first and second electrodes are tilted away from the center axis of the capacitor element.

In this electric double-layer capacitor, electrodes of the capacitor element are connected to the case and sealing plate reliably.

REFERENCE NUMERALS

| | |
|---|---|
| 1 | Capacitor Element |
| 1A | Electrode (First Electrode) |
| 1B | Electrode (Second Electrode) |
| 1D | End Surface of Capacitor Element (First End Surface) |
| 1E | End Surface of Capacitor Element (Second End Surface) |
| 1F | Center Axis |
| 2 | Case |
| 3 | Terminal Plate |
| 5 | Processing Device |
| 6 | Capacitor Element |
| 6A | Electrode (First Electrode) |
| 6B | Electrode (Second Electrode) |
| 7 | Insulating Layer |
| 8 | Driving Electrolyte |
| 22A | Collector (First Collector) |
| 22B | Collector (Second Collector) |
| 23A | Polarizable Electrode Layer (First Polarizable Electrode Layer) |
| 23B | Polarizable Electrode Layer (Second Polarizable Electrode Layer) |
| 24A | Separator (First Separator) |
| 24B | Separator (Second Separator) |
| 76A | Inner Portion of Electrode |
| 86A | Outer Portion of Electrode |
| 102 | Case |
| 102S | Shrink portion (First Shrink portion) |
| 102T | Shrink portion (Second Shrink portion) |
| 102U | Shrink projections |
| 103 | Terminal Plate |

DETAILED DESCRIPTION OF THE INVENTION

Exemplary Embodiment 1

Figure 1:
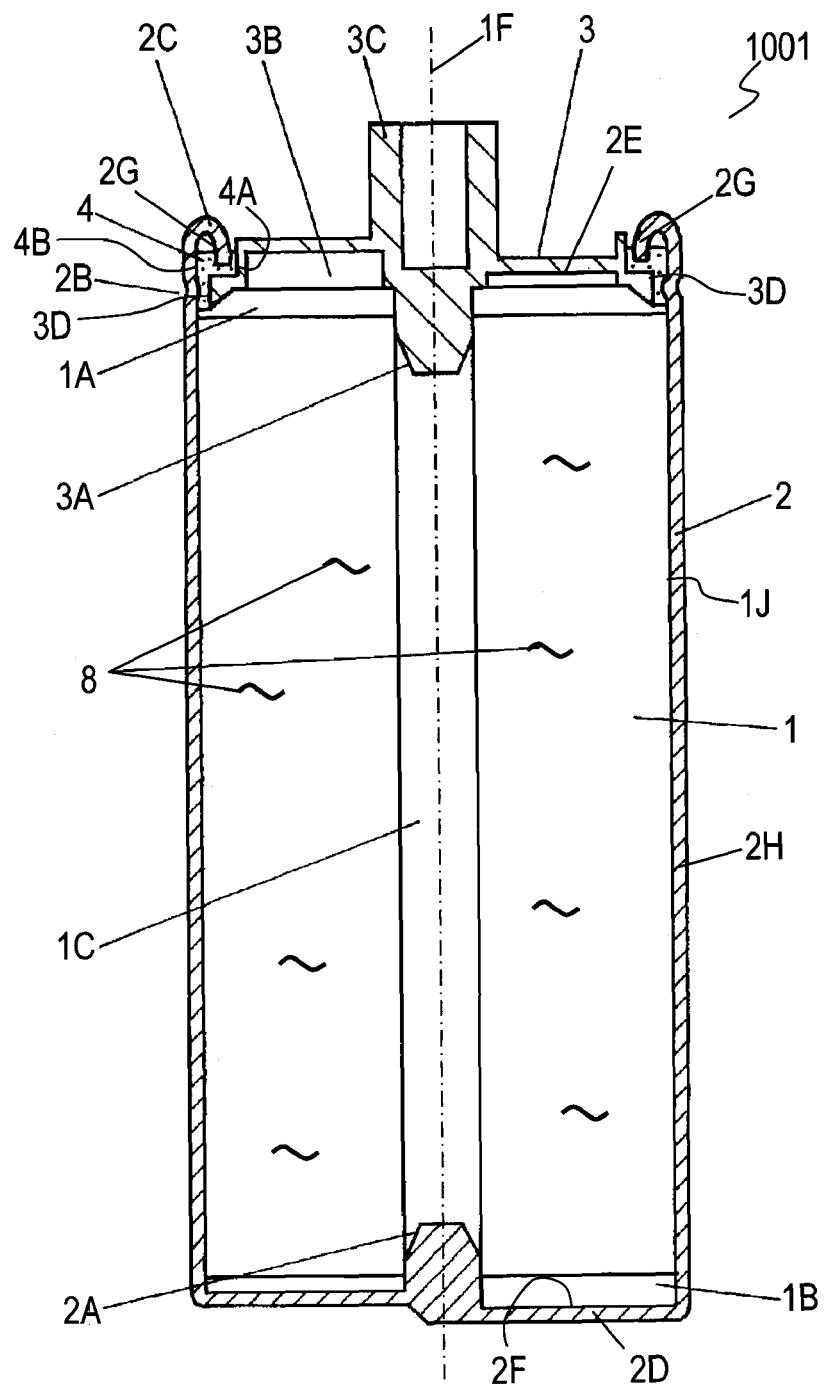
FIG. 1 is a sectional view of an electric double-layer capacitor in accordance with Exemplary Embodiment 1 of the present invention.
Figure 2A:
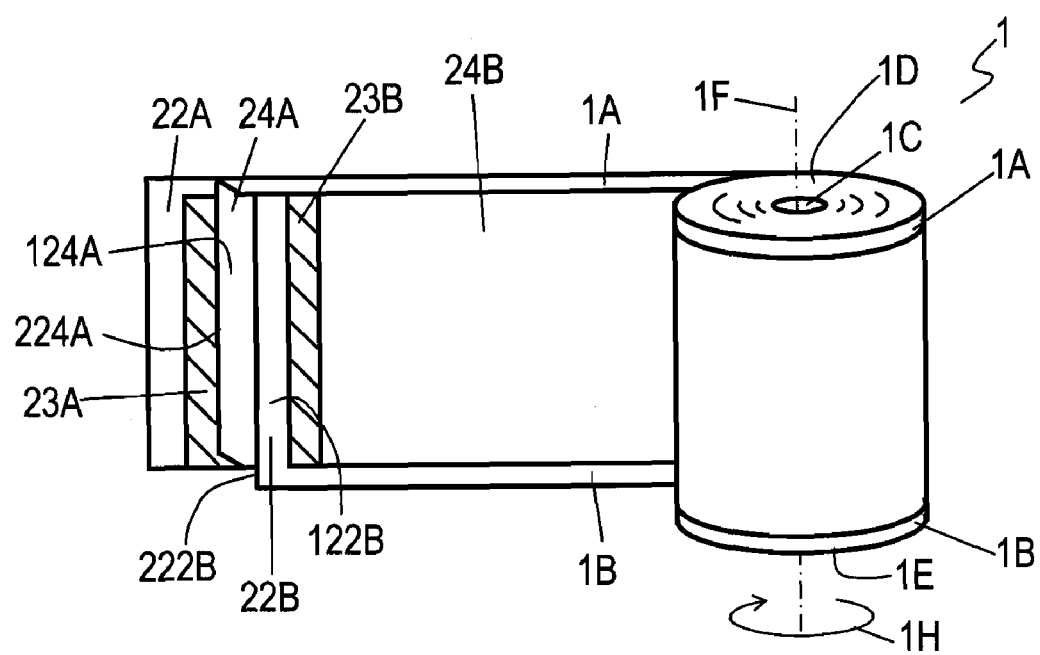
FIG. 2A is a perspective view of a capacitor element of the electric double-layer capacitor in accordance with Embodiment 1.
Figure 2B:
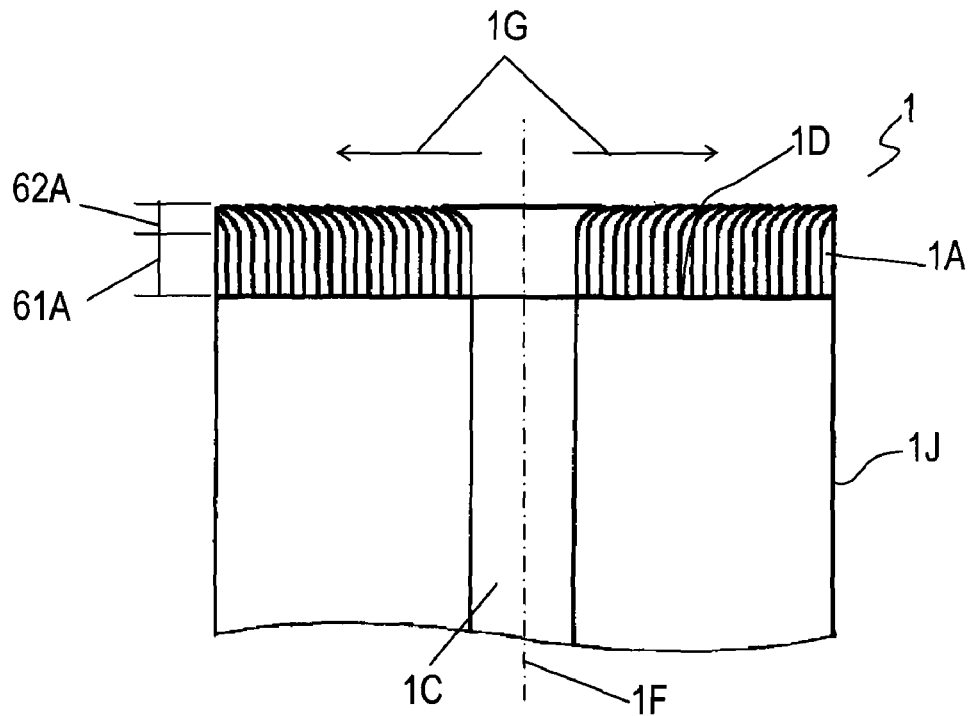
FIG. 2B is an enlarged sectional view of the capacitor element of the electric double-layer capacitor in accordance with Embodiment 1.
Figure 2C:
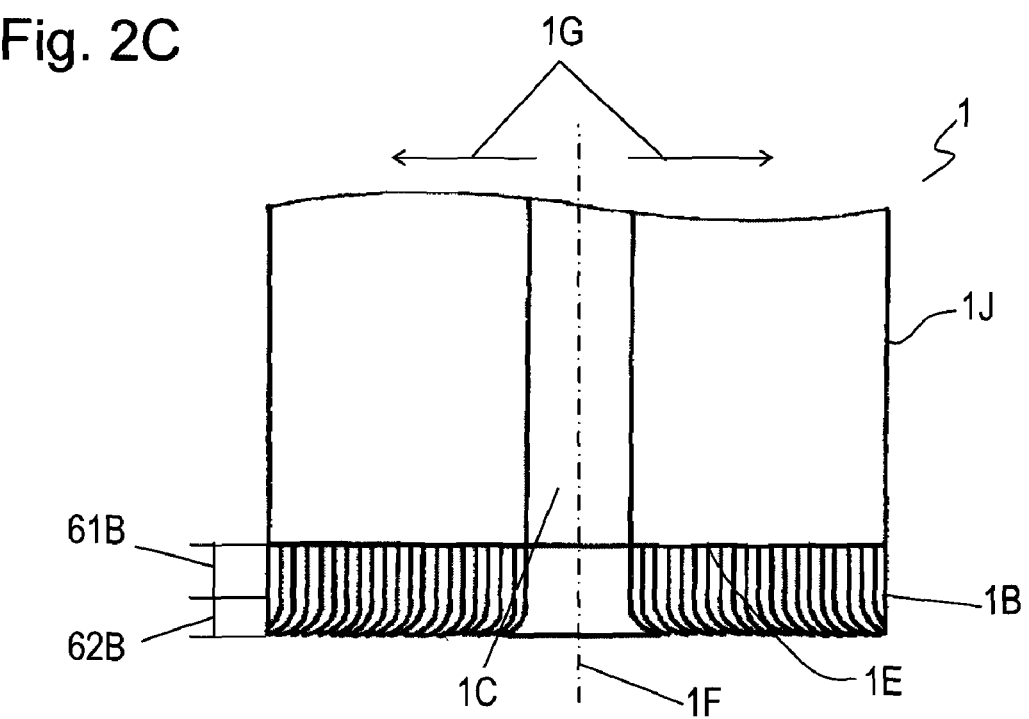
FIG. 2C is an enlarged sectional view of the capacitor element of the electric double-layer capacitor in accordance with Embodiment 1.

FIG. 1 is a sectional view of electric double-layer capacitor 1001 in accordance with Exemplary Embodiment 1 of the present invention. FIGS. 2A, 2B, 2C are a perspective view, an enlarged sectional view, and an enlarged sectional view of capacitor element 1 of electric double-layer capacitor 1001, respectively.

As shown in FIG. 2A, capacitor element 1 includes collectors 22A and 22B made of metal foil, such as an aluminum foil, having strip shapes, polarizable electrode layers 23A and 23B provided on collectors 22A and 22B, respectively, and separators 24A and 24B having insulating property provided on polarizable electrode layers 23A and 23B, respectively. Collector 22B has surface 122B contacting polarizable electrode layer 23B and surface 222B opposite to surface 122B. Separator 24A has surface 224A contacting polarizable electrode layer 23A and surface 124A opposite to surface 224A. Collector 22A, polarizable electrode layer 23A, separator 24A, collector 22B, polarizable electrode layer 23B, and separator 24B are stacked so that surface 124A of separator 24A contacts surface 222B of collector 22B. These stacked layers are wound about center axis 1F of hollow portion 1C in direction 1H, thereby providing capacitor element 1. Capacitor element 1 has a cylindrical shape centering on center axis 1F (hollow portion 1C), and has end surfaces 1D and 1E opposite to each other in a direction of center axis 1F of hollow portion 1C. Collectors 22A and 22B includes electrodes 1A and 1B exposed from end surfaces 1D and 1E, respectively. As shown in FIG. 2B, electrode 1A is tilted in radial direction 1G proceeding away from center axis 1F (hollow portion 1C). As shown in FIG. 2C, similarly, electrodes 1A is tilted in radial direction 1G proceeding away from center axis 1F (hollow portion 1C). Capacitor element 1 has outer surface 1J parallel to center axis 1F. In other words, collector 22A is wound around center axis 1F. Polarizable electrode layer 23A is wound around center axis 1F, and is provided on collector 22A in a direction toward center axis 1F. Separator 24A is wound around center axis 1F, and is provided on polarizable electrode layer 23A in the direction toward center axis 1F. Collector 22B is wound around center axis 1F, and is provided on separator 24A in the direction toward center axis 1F. Polarizable electrode layer 23B is wound around center axis 1F, and is provided on collector 22B in the direction toward center axis 1F. Separator 24B is wound around center axis 1F, and is provided on polarizable electrode layer 23B in the direction toward center axis 1F. Electrode 1A extends from collector 22A in parallel to center axis 1F. Electrode 1B extends from collector 22B in parallel to center axis 1F in a direction opposite to a direction in which electrode 1A extends. Electrodes 1A and 1B have spiral shapes spread about center axis 1F, and extend in parallel to center axis 1F from end surfaces 1D and 1E, respectively.

Case 2 made of metal, such as aluminum, has a cylindrical shape, and has bottom 2D facing end surface 1E of capacitor element 1, side surface 2H facing outer surface 1J of capacitor element 1, and opening 2E facing end surface 1D of capacitor element 1. Capacitor element 1 and driving electrolyte 8 are accommodated in case 2. Projection 2A is provided unitarily with inner bottom surface 2F of case 2, and is inserted into hollow portion 1C of capacitor element 1. Electrode 1B provided on end surface 1E of capacitor element 1 is joined mechanically and electrically to inner bottom surface 2F of case 2 by, for example, laser welding.

Terminal plate 3 having an annular shape has outer circumference surface 3D having a step portion including an upper step thereof having a smaller diameter. Projection 3A is provided on inner surface 3E of terminal plate 3. Recess 3B is provided in inner surface 3E of terminal plate 3. Thread 3C for external connection is provided on outer surface 3F of terminal plate 3. Projection 3A is inserted into hollow portion 1C of capacitor element 1. Electrode 1A exposed at end surface 1E of capacitor element 1 is joined mechanically and electrically on recess 3B of terminal plate 3 by, for example, laser welding.

Sealing rubber 4 has a ring shape having a cross section of a reversed-L shape. Inner circumference surface 4A of sealing rubber 4 contacts a flat portion of the step portion of outer circumference surface 3D of terminal plate 3 and a lower portion of outer circumference surface 3D connected to the flat portion. Outer circumference surface 4B of sealing rubber 4 contacts an inner surface of case 2. A portion of case 2 which outer circumference surface 4B of sealing rubber 4 contacts has annular shrink portion 2B having a diameter thereof locally reduced. Sealing rubber 4 is compressed with shrink portion 2B of case 2. Curled section 2C bent and curled toward an inside of opening 2E is formed at end 2G of opening 2E of case 2, and compresses the flat portion of outer circumference surface 4B of sealing rubber 4. Thus, sealing rubber 4 and terminal plate 3 seal opening 2E of case 2.

Electrodes 1A and 1B are tilted in radial direction 1G proceeding away from center axis 1F of capacitor element 1. This structure attaches electrodes 1A and 1B onto terminal plate 3 and case 2 securely, accordingly joining electrodes 1A and 1B onto terminal plate 3 and case 2 reliably by laser welding, respectively.

Figure 3A:
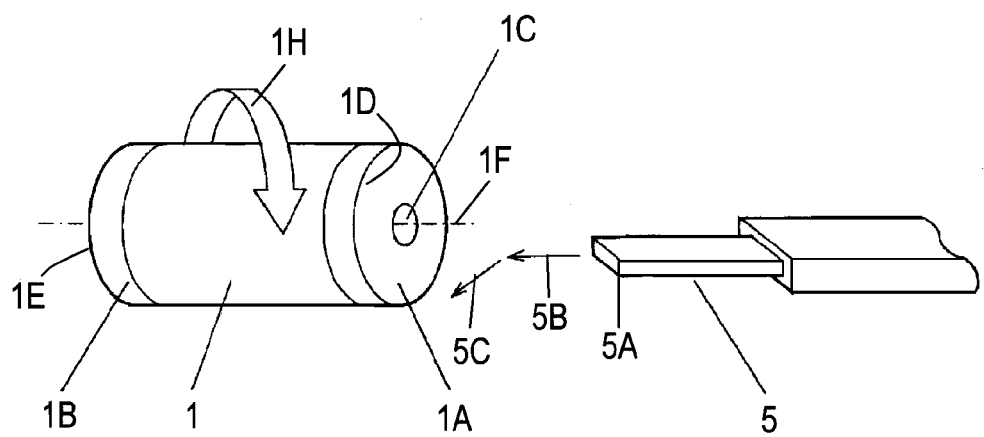
FIG. 3A is a schematic diagram for illustrating a method of manufacturing the capacitor element in accordance with Embodiment 1.
Figure 3B:
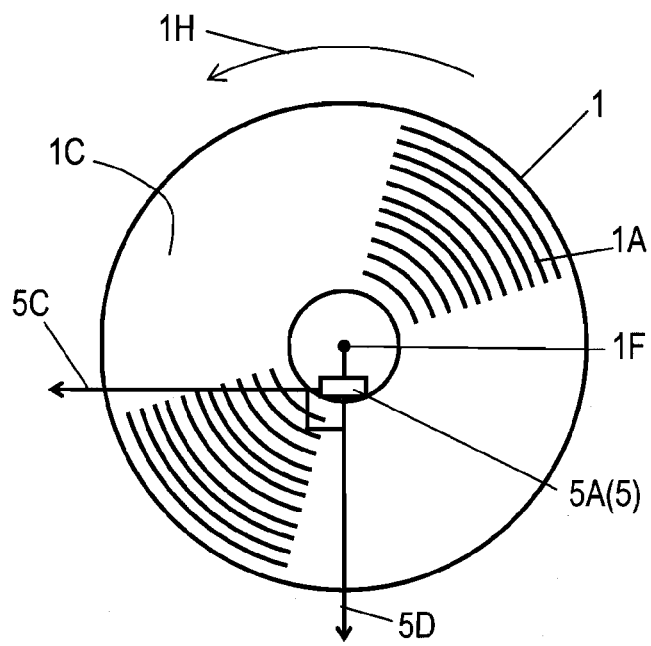
FIG. 3B is a schematic diagram for illustrating the method of manufacturing the capacitor element shown in FIG. 3A.

FIGS. 3A and 3B are schematic diagrams illustrating a method of manufacturing capacitor element 1. Capacitor element 1 is held with a chuck, and is rotated about center axis 1F in winding direction 1H of collectors 22A and 22B and separators 24A and 24B. While capacitor element 1 is rotated, tip 5A of processing device 5 is moved in direction 5B toward hollow portion 1C of capacitor element 1, and contacts hollow portion 1C of capacitor element 1. At this moment, tip 5A contacts capacitor element 1 in downward direction 5D from center axis 1F about which capacitor element 1 rotates. Then, tip 5A contacts hollow portion 1C of capacitor element 1 and is moved outward in horizontal direction 5C perpendicular to direction 5D. Thus, electrodes 1A and 1B are tilted from center axis 1F in radial direction 1G.

As shown in FIG. 2B, electrode 1A exposed at end surface 1D of capacitor element 1 has base portion 61A that extends from end surface 1D and in parallel to center axis 1F, and tip portion 62A that extends from base portion 61A and is tilted away from center axis 1F (hollow portion 1C). The length of tip portion 62A and the angle of tip portion 62A with respect to center axis 1F are adjusted by an inserted amount of processing device 5, a moving speed of device outward in horizontal direction 5C, and a rotating speed of capacitor element 1.

As shown in FIG. 2C, similarly, electrode 1B exposed at end surface 1E of capacitor element 1 has base portion 61B that extends from end surface 1E and in parallel to center axis 1F, and tip portion 62B that extends from base portion 61B and is tilted away from center axis 1F (hollow portion 1C). The size of tip portion 62B of electrode 1B and the angle of tip portion 62B with respect to center axis 1F are adjusted precisely based on an inserted amount of the processing device, a moving speed of the device outward in the horizontal direction, and the rotating speed of capacitor element 1.

Exemplary Embodiment 2

Figure 4A:
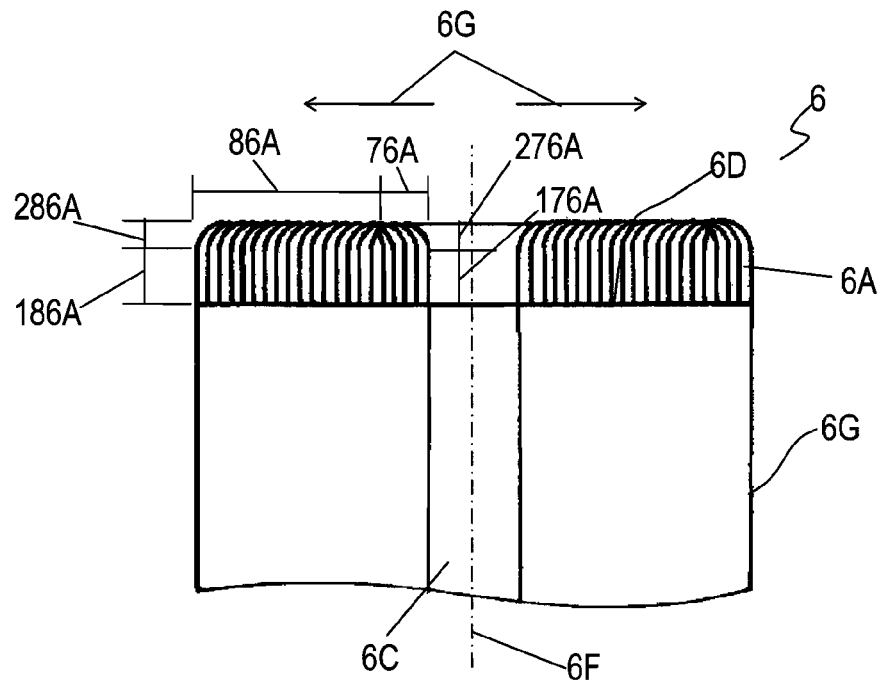
FIG. 4A is an enlarged sectional view of a capacitor element of an electric double-layer capacitor in accordance with Exemplary Embodiment 2 of the invention.
Figure 4B:
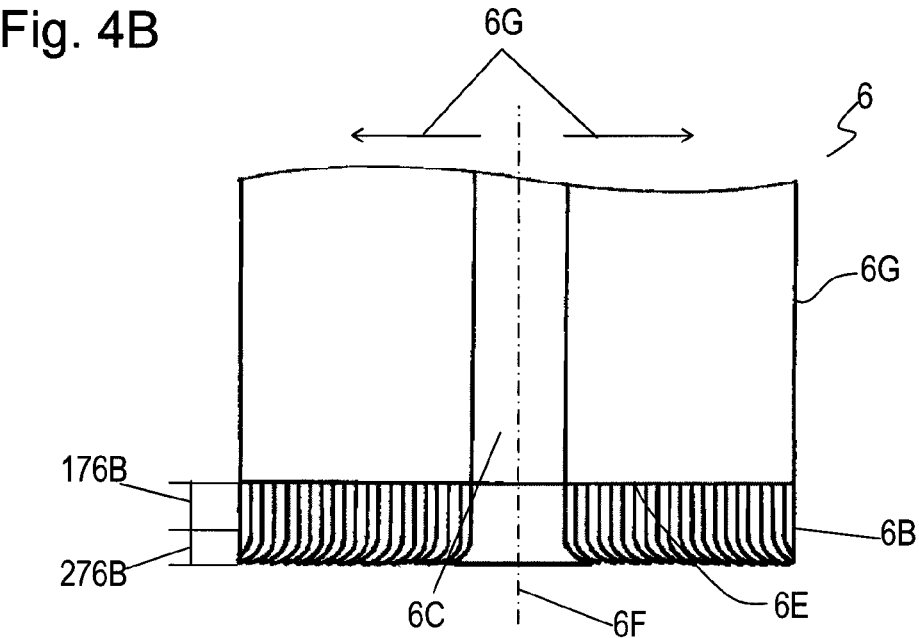
FIG. 4B is an enlarged sectional view of the capacitor element shown in FIG. 4A.

FIGS. 4A and 4B are enlarged sectional views of capacitor element 6 of an electric double-layer capacitor in accordance with Exemplary Embodiment 2 of the present invention. In FIGS. 4A and 4B, components identical to those of electric double-layer capacitor 1001 shown in FIGS. 1 to 2B are denoted by the same reference numerals, and their description will be omitted. The electric double-layer capacitor according to Embodiment 2 includes capacitor element 6 instead of capacitor element 1 of electric double-layer capacitor 1001 according to Embodiment shown in FIGS. 1 to 2B. Capacitor element 6 has center axis 6F and hollow portion 6C corresponding to center axis 1F and hollow portion 1C of capacitor element 1, respectively. Capacitor element 6 has end surfaces 6A and 6B opposite to each other in a direction of center axis 6F corresponding to end surfaces 1D and 1E of capacitor element 1, respectively. Capacitor element 6 includes electrodes 6A and 6B that are exposed at end surfaces 6D and 6E and correspond to electrodes 1A and 1B of capacitor element 1, respectively. Outer surface 6G of capacitor element 6 is parallel to center axis 6F, and faces side surface 2H of case 2 while capacitor element 6 is accommodated in case 2.

As shown in FIG. 4A, electrode 6A joined to terminal plate 3 has inner portion 76A connected to hollow portion 6C (center axis 6F), and outer portion 86A farther from hollow portion 6C (center axis 6F) than inner portion 76A. Outer portion 86A is connected to outer surface 6G of capacitor element 6. Inner portion 76A of electrode 6A has inner base portion 176A that extends from end surface 6D and in parallel to center axis 6F, and inner tip portion 276A that extends from inner base portion 176A and is tilted away from center axis 6F (hollow portion 6C). Outer portion 86A of electrode 6A has outer base portion 186A that extends from end surface 6D and in parallel to center axis 6F, and outer tip portion 286A that extends from outer base portion 186A and is tilted towards center axis 6F (hollow portion 6C).

As shown in FIG. 4B, electrode 6B joined to inner bottom surface 2F of case 2 has base portion 176B that extends from end surface 6E and in parallel to center axis 6F, and tip portion 276B that extends from base portion 176B and is tilted away from center axis 6F (hollow portion 6C).

A method of manufacturing capacitor element 6 will be described below. First, electrodes 6A and 6B are tilted away from center axis 6F (hollow portion 6C) with processing device 5, similarly to capacitor element 1 shown in FIGS. 3A and 3B. Then, processing device 5 contacts outer surface 6G and is moved from outer surface 6G toward hollow portion 6C, thereby tilting outer tip portion 286A of electrode 6A toward center axis 6F (hollow portion 6C). The sizes of tip portions 276A, 286A, and 276B of electrodes 6A and 6B and the angles of the tip portions with respect to center axis 1F are adjusted precisely based on an inserted amount of processing device 5, a moving speed of device 5 outward in a horizontal direction, and a rotating speed of capacitor element 6. Inner tip portion 276A and outer tip portion 286A of electrode 6A may be formed by pressing a device with a shape analogous to the shape of electrode 6A after processing as shown in FIG. 4A.

In the electric double-layer capacitor according to Embodiment 2, outer portion 86A of electrode 6A of capacitor element 6 is tilted toward hollow portion 6C. This structure prevents electrode 6A from contacting case 2 and from causing short circuit, thus providing the electric double-layer capacitor with high reliability.

Exemplary Embodiment 3

Figure 5:
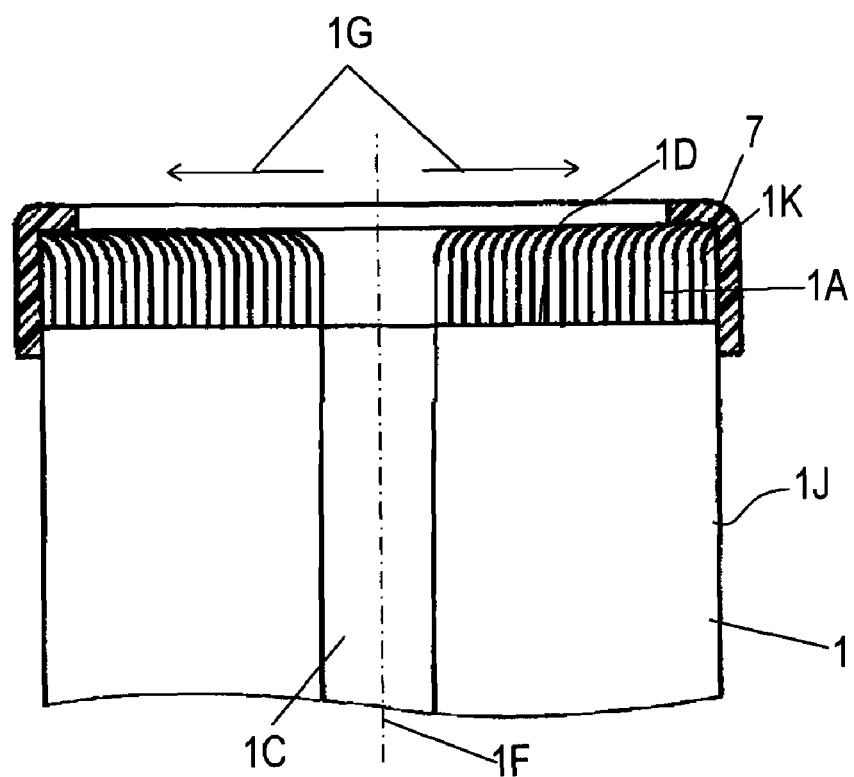
FIG. 5 is an enlarged sectional view of a capacitor element of an electric double-layer capacitor in accordance with Exemplary Embodiment 3 of the invention.

FIG. 5 is an enlarged sectional view of a capacitor element of an electric double-layer capacitor in accordance with Exemplary Embodiment 3 of the present invention. In FIG. 5, components identical to those of electric double-layer capacitor 1001 shown in FIGS. 1 to 2B are denoted by the same reference numerals, and their description will be omitted.

The electric double-layer capacitor according to Embodiment 3 further includes insulating layer 7 covering outer peripheral portion 1K of electrode 1A in addition to capacitor 1001 according to Embodiment 1. Insulating layer 7 can be formed by winding an insulating tape on outer peripheral portion 1K of electrode 1A.

Insulating layer 7 covering outer peripheral portion 1K of electrode 1A prevents electrode 1A from contacting an inner surface of case 2 and from causing short circuit, thus providing the electric double-layer capacitor with high reliability.

Exemplary Embodiment 4

Figure 6:
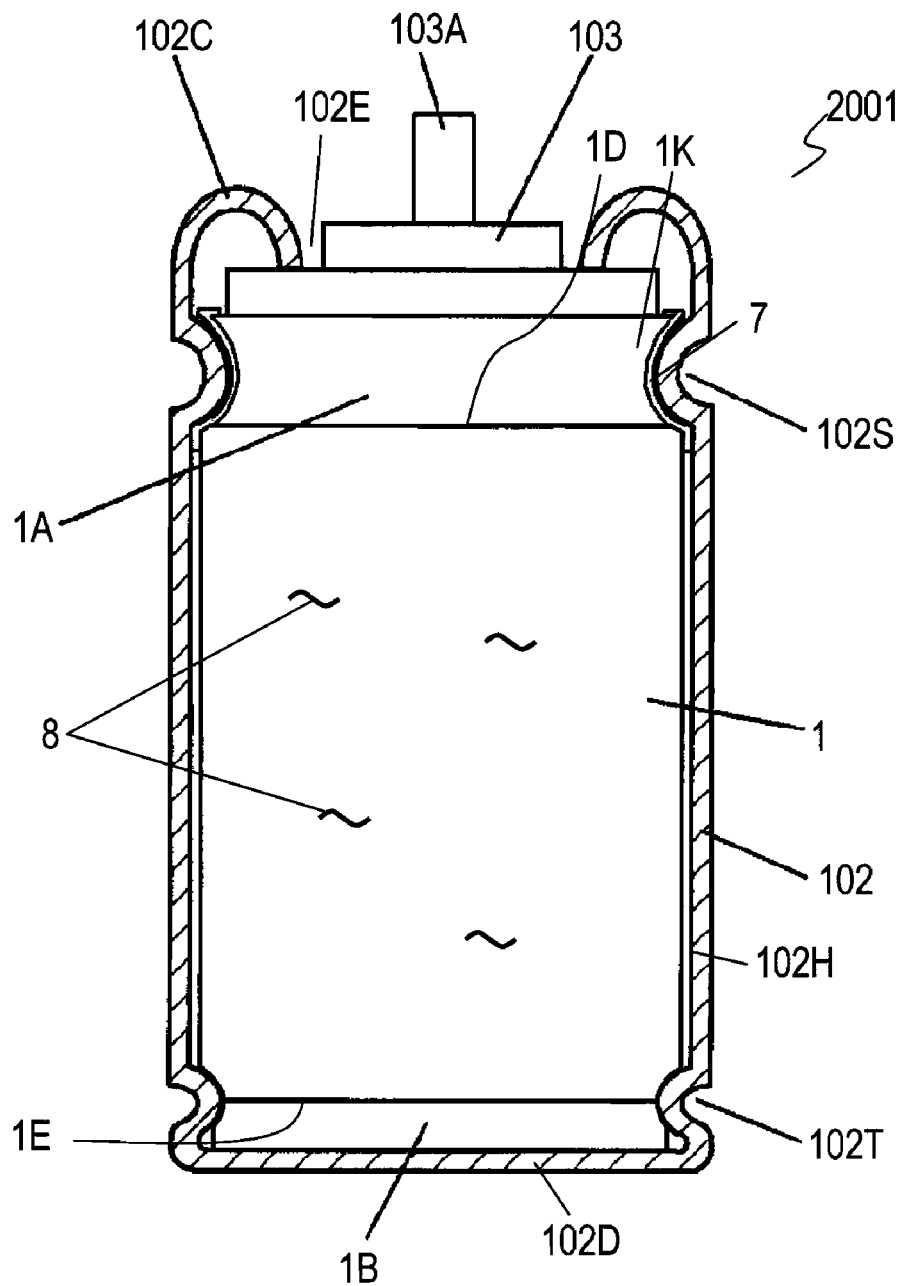
FIG. 6 is a sectional view of an electric double-layer capacitor in accordance with Exemplary Embodiment 4 of the invention.

FIG. 6 is a sectional view of electric double-layer capacitor 2001 in accordance with Exemplary Embodiment 4 of the present invention. In FIG. 6, components identical to those of electric double-layer capacitor 1001 shown in FIGS. 1 to 2B are denoted by the same reference numerals, and their description will be omitted.

Case 102 made of metal, such as aluminum, has a cylindrical shape, and has bottom 102D facing end surface 1E of capacitor element 1, side surface 102H facing outer surface 1J of capacitor element 1, and opening 102E facing end surface 1D of capacitor element 1. Capacitor element 1 and driving electrolyte 8 are accommodated in case 102. Electrode 1B provided on end surface 1E of capacitor element 1 is joined mechanically and electrically to inner bottom surface 102F of case 102 by, for example, laser welding.

Annular shrink portions 102S and 102T having diameters locally reduced are provided near opening 102E and bottom 102D of case 102, respectively. Shrink portions 102S and 102T press electrodes 1A and 1B exposed at end surfaces 1D and 1E of capacitor element 1 over the entire circumference and fix capacitor element 1 so as to prevent capacitor element 1 from moving in case 102.

Terminal plate 103 has terminal 103A for external connection. Terminal plate 103 is inserted into opening 102E of case 102. Curled section 102C bent and curled toward an inside of opening 102E is formed at end 102G of opening 102E of case 102. Insulating layer 7 for insulating case 102 from electrode 1A is provided on outer peripheral portion 1K of electrode 1A of capacitor element 1. Insulating layer 7 is formed by sticking an insulating tape to outer peripheral portion 1K of electrode 1A.

In electric double-layer capacitor 2001, electrodes 1A and 1B provided on end surfaces 1D and 1E of capacitor element 1 are pressed by shrink portions 102S and 102T provided in case 102, thereby fixing capacitor element 1 to case 102. Even when large vibration is applied, capacitor element 1 does not move in case 102, thus providing electric double-layer capacitor 2001 with high resistance against vibration.

While capacitor element 1 is accommodated in case 102 having shrink portions 102S and 102T, electrodes 1A and 1B of capacitor element 1 may not necessarily be tilted away from center axis 1F, but may be parallel to center axis 1F.

Exemplary Embodiment 5

Figure 7:
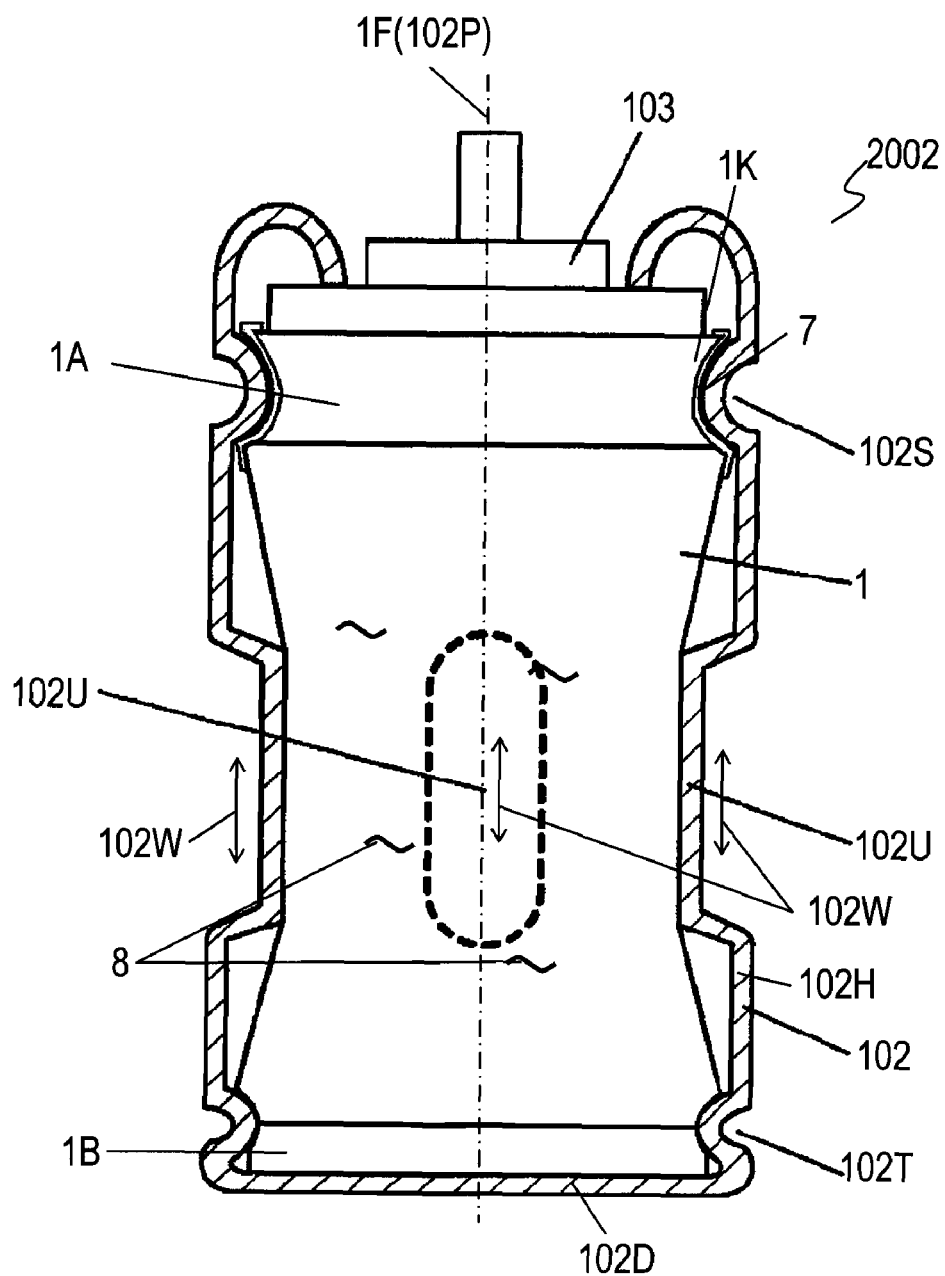
FIG. 7 is a sectional view of an electric double-layer capacitor in accordance with Exemplary Embodiment 5 of the invention.

FIG. 7 is a sectional view of electric double-layer capacitor 2002 in accordance with Exemplary Embodiment 5 of the present invention. In FIG. 7, components identical to those of electric double-layer capacitor 2001 according to Embodiment 5 shown in FIG. 6 are denoted by the same reference numerals, and their description will be omitted.

Four shrink projections 102U projecting toward an inside of case 102 are formed on side surface 102H of case 102 of electric double-layer capacitor 2002. Shrink projections 102U has a longitudinally long shape having longitudinal direction 102W parallel to center axis 102P of case 102, center axis 1F of capacitor element 1. Four shrink projections 102U are located substantively at an intermediate between shrink portions 102S and 102T and at equal angular intervals (90 degrees) about center axis 1F (102P).

Four shrink projections 102U press outer surface 1J of capacitor element 1, and fix capacitor element 1 to case 102.

If shrink projections 102U of case 102 has an annular shape or a substantively annular shape, shrink projections 102U prevent driving electrolyte 8 impregnated in capacitor element 1 from circulating. Therefore, shrink projections 102U are provided preferably with certain intervals between projections 102U.

In electric double-layer capacitor 2002, outer surface 1J of capacitor element 1 and electrodes 1A and 1B provided on end surfaces 1D and 1E of capacitor element 1 are pressed with shrink portions 102S and 102T and shrink projections 102U provided in case 102, thereby fixing capacitor element 1 to case 102. Even when large vibration is applied, capacitor element 1 does not move in case 102, thus providing electric double-layer capacitor 2002 with high resistance against vibration.

According to Embodiment 5, the number of shrink projections 102U provided in case 102 is four. However, two or more shrink projections 102U may be provided at equal angle intervals about center axis 1F (102P), providing the same effects. The shapes of shrink projections 102U may not necessarily have the longitudinally long shape.

While capacitor element 1 is accommodated in case 102 having shrink portions 102S and 102T and shrink projections 102U, electrodes 1A and 1B of capacitor element 1 may not necessarily be tilted away from center axis 1F, but may be parallel to center axis 1F.

Exemplary Embodiment 6

Figure 8:
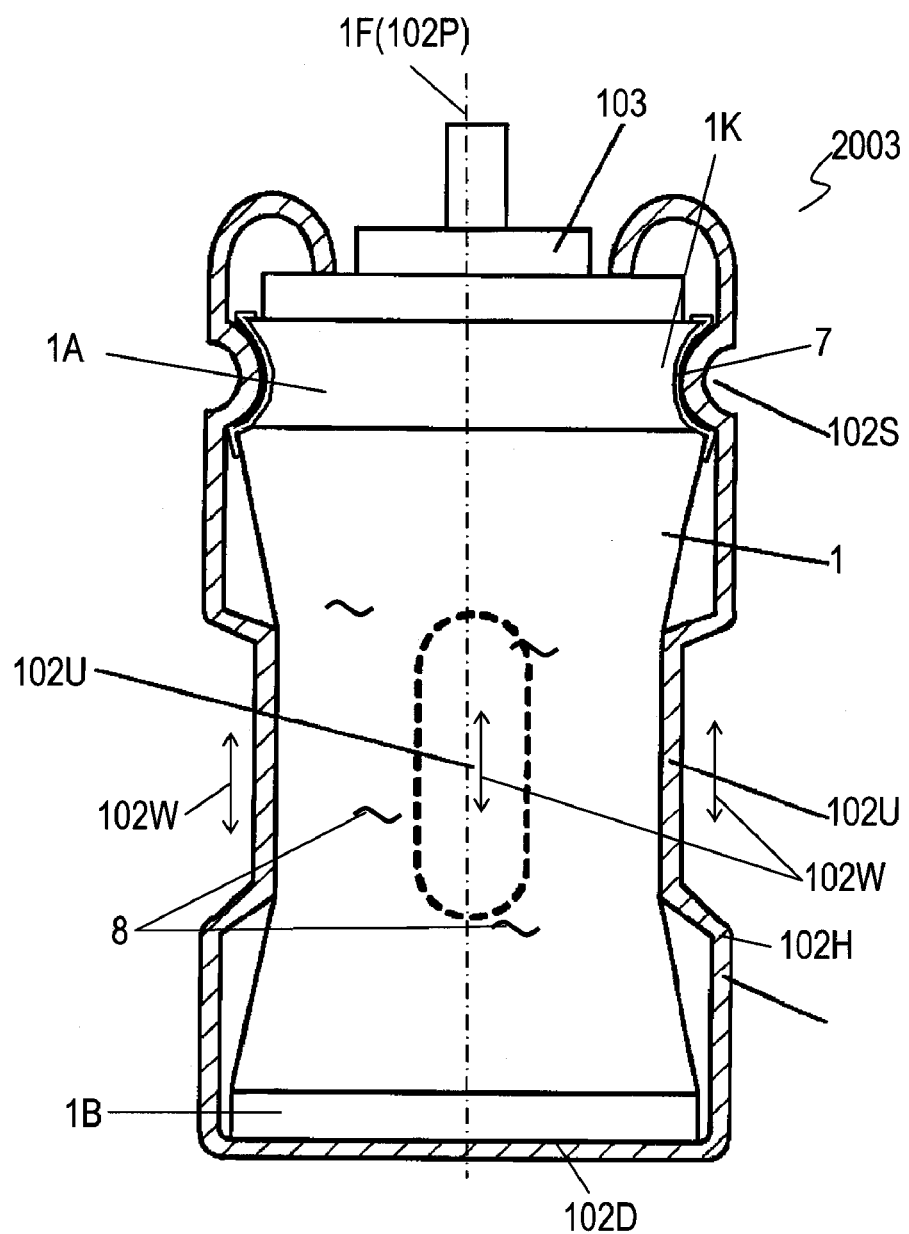
FIG. 8 is a sectional view of an electric double-layer capacitor in accordance with Exemplary Embodiment 6 of the invention.
Figure 9:
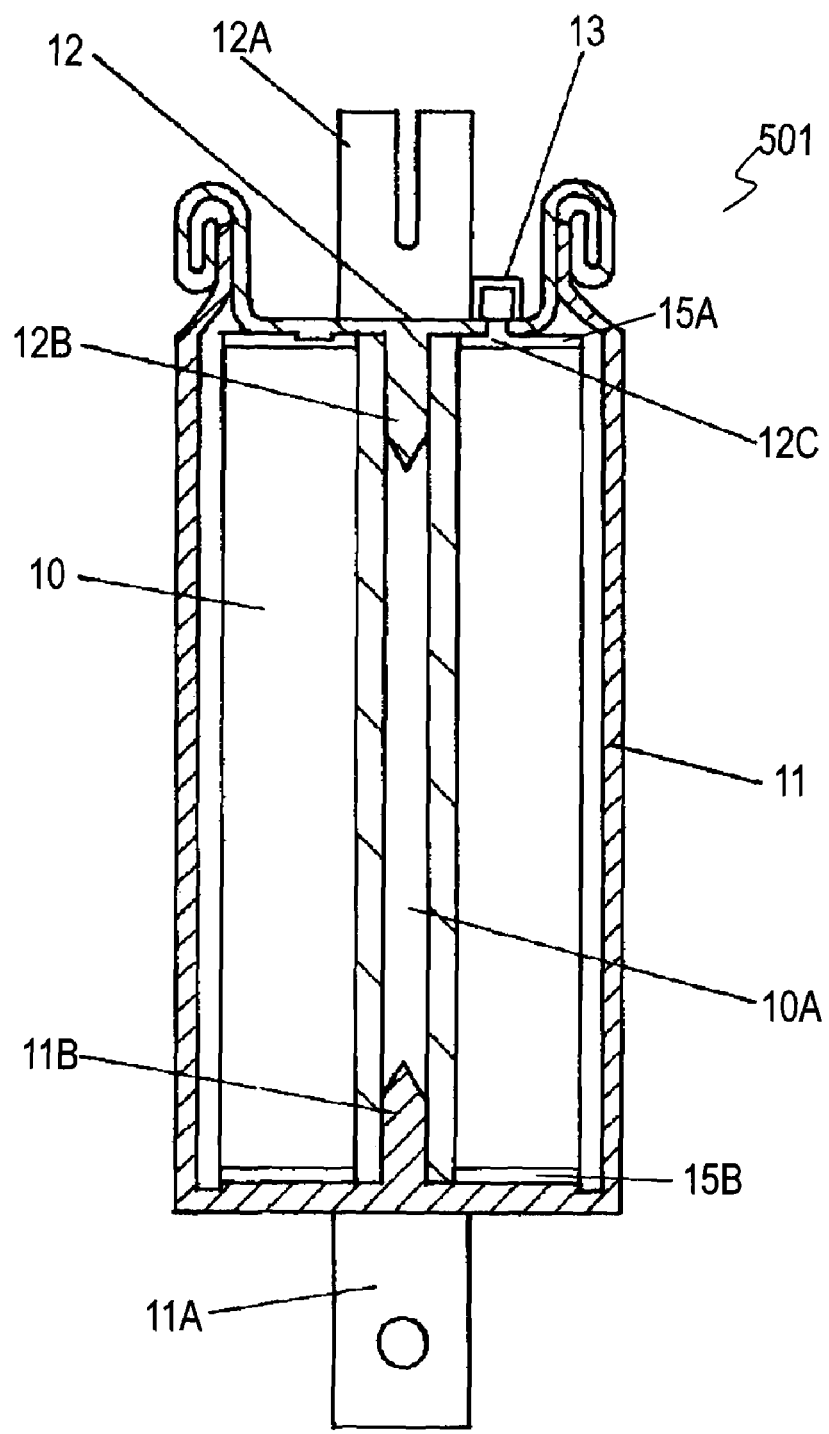
FIG. 9 is a sectional view of a conventional electric double-layer capacitor.
Figure 10:
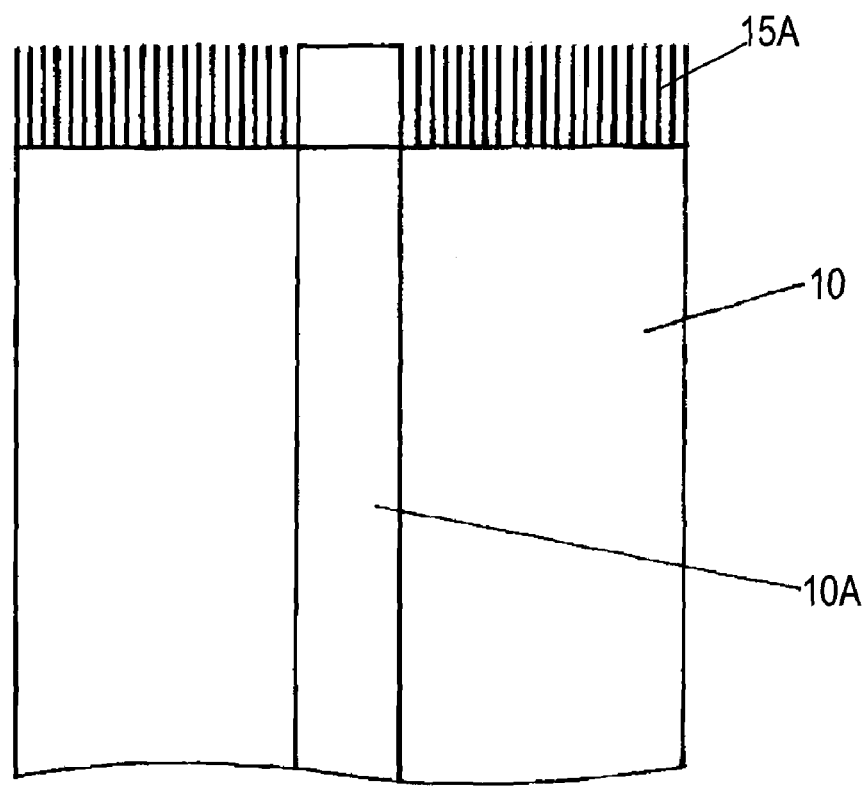
FIG. 10 is an enlarged sectional view of the conventional electric double-layer capacitor.

FIG. 8 is a sectional view of electric double-layer capacitor 2003 in accordance with Exemplary Embodiment 6 of the present invention. In FIG. 8, components identical to those of electric double-layer capacitor 1002 according to Embodiment 5 shown in FIG. 7 are denoted by the same reference numerals, and their description will be are omitted.

As shown in FIG. 8, case 102 of electric double-layer capacitor 2003 has shrink portion 102S and shrink projections 102U for pressing electrode 1A and outer surface 1J of capacitor element 1, but does not have shrink portion 102T for pressing electrode 1B shown in FIG. 7.

In electric double-layer capacitor 2003, outer surface 1J of capacitor element 1 and electrode 1A disposed on end surface 1D of capacitor element 1 are pressed with shrink portion 102S and shrink projections 102U provided in case 102, thereby fixing capacitor element 1 to case 102. Even when large vibration is applied, capacitor element 1 does not move in case 102, thus providing electric double-layer capacitor 2003 with high resistance against vibration.

While capacitor element 1 is accommodated in case 102 having shrink portion 102S and shrink projections 102U, electrodes 1A and 1B of capacitor element 1 may not necessarily be tilted away from center axis 1F, but may be parallel to center axis 1F.

INDUSTRIAL APPLICABILITY

An electric double-layer capacitor according to the present invention includes electrodes of a capacitor element connected reliably to a case and sealing plate, hence being useful for an electronic device requiring resistance to vibration.

The invention claimed is:
1. An electric double-layer capacitor comprising:
 a cylindrical case having a bottom and a side surface, the case having an opening;
 a capacitor element accommodated in the case, the capacitor element including
  a first collector made of metal foil wound around a center axis,
  a first polarizable electrode layer wound around the center axis and provided on the first collector in a direction toward the center axis,
  a first separator wound around the center axis and provided on the first polarizable electrode layer in the direction toward the center axis,
  a second collector made of metal foil wound around the center axis and provided on the first separator in the direction toward the center axis, a second polarizable electrode layer wound around the center axis and provided on the second collector in the direction toward the center axis, a second separator wound around the center axis and provided on the second polarizable electrode layer in the direction toward the center axis, a first electrode extending from the first collector and parallel to the center axis, and a second electrode extending from the second collector in a direction opposite to the first electrode and parallel to the center axis;

a driving electrolyte accommodated in the case; and a terminal plate provided at the opening of the case and joined to the first electrode of the capacitor element, wherein the capacitor element has a first end surface and a second end surface opposite to each other in a direction of the center axis, the second end surface facing the bottom of the case, the first electrode extends from the first end surface and has a spiral shape extending continuously around the center axis, the second electrode extends from the second end surface and is joined to the bottom of the case, and the second electrode has a spiral shape extending continuously around the center axis, the first electrode and the second electrode are tilted away from the center axis of the capacitor element, and one of the first electrode and the second electrode is entirely tilted away from the center axis of the capacitor element.

2. The electric double-layer capacitor of claim 1, further comprising an insulating layer provided between an outer periphery of the first electrode and the case.

3. The electric double-layer capacitor of claim 1, wherein the side surface of the case has a first shrink portion having a diameter locally reduced, the first shrink portion pressing the first electrode, the first shrink portion being disposed annularly about the center axis.

4. The electric double-layer capacitor of claim 3, wherein the side surface of the case includes a second shrink portion having a diameter locally reduced, the second shrink portion pressing the second electrode, the second shrink portion being provided annularly about the center axis.

5. The electric double-layer capacitor of claim 3, wherein
the capacitor element includes an outer surface that faces the side surface of the case and is parallel to the center axis, and the side surface of the case includes a plurality of shrink projections that project toward an inside of the case and press the outer surface of the capacitor element.

6. The electric double-layer capacitor of claim 5, wherein the shrink projections are located at equal angular intervals about the center axis in the side surface of the case.

7. The electric double-layer capacitor of claim 5, wherein the shrink projections extend in longitudinal directions parallel to the center axis.

8. The electric double-layer capacitor of claim 1, wherein
the capacitor element includes an outer surface that faces the side surface of the case and is parallel to the center axis, and the side surface of the case includes a plurality of shrink projections that project toward an inside of the case and press the outer surface of the capacitor element.

9. The electric double-layer capacitor of claim 8, wherein the shrink projections are located in the side surface of the case at equal angular intervals about the center axis.

10. The electric double-layer capacitor of claim 8, wherein the shrink portions extend in longitudinal directions parallel to the center axis.

11. The electric double-layer capacitor of claim 1, wherein
the first collector has a first edge exposed from the first end surface, and the first electrode extends entirely from the first edge of the first collector.

12. The electric double-layer capacitor of claim 11, wherein
the second collector has a second edge exposed from the second end surface, and the second electrode extends entirely from the second edge of the second collector.

13. The electric double-layer capacitor of claim 1, wherein
the second collector has an edge exposed from the second end surface, and the second electrode extends entirely from the edge of the second collector.

14. The electric double-layer capacitor of claim 1, wherein
the first electrode of the capacitor element faces a portion of a surface of the terminal plate, and the portion of the surface of the terminal plate is substantially entirely joined to the first electrode of the capacitor element.

15. The electric double-layer capacitor of claim 1, wherein another of the first electrode and the second electrode is entirely tilted away from the center axis of the capacitor element.

16. An electric double-layer capacitor comprising:
a cylindrical case having a bottom and a side surface, the case having an opening;

a capacitor element accommodated in the case, the capacitor element including
a first collector made of metal foil wound around a center axis, a first polarizable electrode layer wound around the center axis and provided on the first collector in a direction toward the center axis, a first separator wound around the center axis and provided on the first polarizable electrode layer in the direction toward the center axis, a second collector made of metal foil wound around the center axis and provided on the first separator in the direction toward the center axis, a second polarizable electrode layer wound around the center axis and provided on the second collector in the direction toward the center axis, a second separator wound around the center axis and provided on the second polarizable electrode layer in the direction toward the center axis, a first electrode extending from the first collector and parallel to the center axis, and a second electrode extending from the second collector in a direction opposite to the first electrode and parallel to the center axis;

a driving electrolyte accommodated in the case; and a terminal plate provided at the opening of the case and joined to the first electrode of the capacitor element, wherein the capacitor element has a first end surface and a second end surface opposite to each other in a direction of the center axis, the second end surface facing the bottom of the case, the first electrode extends from the first end surface and has a spiral shape extending continuously around the center axis, the second electrode extends from the second end surface and is joined to the bottom of the case, and the second electrode has a spiral shape extending continuously around the center axis, the capacitor element includes an outer surface that faces the side surface of the case and is parallel to the center axis, and the first electrode includes an inner portion tilted away from the center axis, and an outer portion located farther from the center axis than the inner portion, the outer portion being connected to the outer surface of the capacitor element, the outer portion being tilted towards the center axis.

17. An electric double-layer capacitor comprising:

a cylindrical case having a bottom and a side surface, the case having an opening;

a capacitor element accommodated in the case, the capacitor element including a first collector made of metal foil wound around a center axis, a first polarizable electrode layer wound around the center axis and provided on the first collector in a direction toward the center axis, a first separator wound around the center axis and provided on the first polarizable electrode layer in the direction toward the center axis, a second collector made of metal foil wound around the center axis and provided on the first separator in the direction toward the center axis, a second polarizable electrode layer wound around the center axis and provided on the second collector in the direction toward the center axis, a second separator wound around the center axis and provided on the second polarizable electrode layer in the direction toward the center axis, a first electrode extending from the first collector and parallel to the center axis, and a second electrode extending from the second collector in a direction opposite to the first electrode and parallel to the center axis;

a driving electrolyte accommodated in the case; and a terminal plate that is provided at the opening of the case and joined to the first electrode of the capacitor element, wherein the capacitor element has a first end surface and a second end surface opposite to each other in a direction of the center axis, the first electrode extends from the first end surface, the second electrode extends from the second end surface and is joined to the bottom of the case, the side surface of the case has a first shrink portion having a diameter locally reduced, the first shrink portion pressing the first electrode, the first shrink portion being provided annularly about the center axis and positioned at the first electrode in a height direction parallel to the center axis, and the first shrink portion of the side surface of the case presses the first electrode toward the center axis.

18. The electric double-layer capacitor of claim 17 further comprising an insulating layer disposed between an outer periphery of the first electrode and the case.

19. The electric double-layer capacitor of claim 17, wherein the side surface of the case includes a second shrink portion having a diameter locally reduced, the second shrink portion pressing the second electrode, the second shrink portion being provided annularly about the center axis.

20. The electric double-layer capacitor of claim 17, wherein the capacitor element includes an outer surface that faces the side surface of the case and is parallel to the center axis, and the side surface of the case includes a plurality of shrink projections that project toward an inside of the case and press the outer surface of the capacitor element.

21. The electric double-layer capacitor of claim 20, wherein the shrink projections are located in the side surface of the case at equal angular intervals about the center axis.

22. The electric double-layer capacitor of claim 20, wherein the shrink projections extend in longitudinal directions parallel to the center axis.

23. A method of manufacturing an electric double-layer capacitor, the method comprising:

providing a capacitor element which includes a first collector made of metal foil wound around a center axis, a first polarizable electrode layer wound around the center axis and provided on the first collector in a direction toward the center axis, a first separator wound around the center axis and provided on the first polarizable electrode layer in the direction toward the center axis, a second collector made of metal foil wound around the center axis and provided on the first separator in the direction toward the center axis, a second polarizable electrode layer wound around the center axis and provided on the second collector in the direction toward the center axis, a second separator wound around the center axis and provided on the second polarizable electrode layer in the direction toward the center axis, a first electrode extending from the first collector and parallel to the center axis and having a spiral shape extending continuously around the center axis, and a second electrode extending from the second collector in a direction opposite to the first electrode and parallel to the center axis, the second electrode having a spiral shape extending continuously around the center axis, wherein the capacitor element has a first end surface and a second end surface opposite to each other in a direction of the center axis, and an outer surface that faces the side surface of the case and is parallel to the center axis;

tilting the first electrode away from the center axis after said providing of the capacitor element;

tilting the second electrode away from the center axis after said providing of the capacitor element;

accommodating the capacitor element in a cylindrical case having a bottom, a side surface, and an opening after said tilting of the first electrode and after said tilting of the second electrode;

joining the second electrode to the bottom of the case after said accommodating of the capacitor element in the case;

accommodating a driving electrolyte in the case; and joining a terminal plate to the first electrode of the capacitor element while providing the terminal plate at the opening of the case.

24. The method of claim 23, further comprising providing an insulating layer covering an outer periphery of the first electrode after said tilting of the first electrode.

25. The method of claim 23, wherein
the capacitor element has a hollow portion that extends along the center axis and is connected to the first end surface and the second end surface, and
said tilting of the first electrode comprises:
  allowing a processing device to contact the first electrode in a predetermined direction from the center axis and in the hollow portion while the capacitor element is rotated about the center axis in a winding direction of the first collector; and
  after said allowing the processing device to contact the first electrode, moving the processing device in a direction perpendicular to the predetermined direction while contacting the first electrode while the capacitor element is rotated about the center axis in the winding direction of the first collector.

26. The method of claim 23, wherein
the capacitor element has a hollow portion that extends along the center axis and is connected to the first end surface and the second end surface, and
said tilting of the second electrode comprises:
  allowing a processing device to contact the second electrode in a predetermined direction from the center axis and in the hollow portion, while the capacitor element is rotated about the center axis in a winding direction of the first collector; and
  after said allowing the processing device to contact the second electrode, moving the processing device in a direction perpendicular to the predetermined direction while contacting the second electrode while the capacitor element is rotated about the center axis in the winding direction of the first collector.

27. The method of claim 23, wherein
the first electrode of the capacitor element faces a portion of a surface of the terminal plate, and
said joining the terminal plate directly to the first electrode of the capacitor element comprises joining the terminal plate directly to the first electrode of the capacitor element such that the portion of the surface of the terminal plate is substantially entirely joined to the first electrode of the capacitor element.

28. The method of claim 23,
wherein, in said tilting of the first electrode away from the center axis, the first electrode is entirely tilted away from the center axis after said providing of the capacitor element, or
wherein, in said tilting of the second electrode away from the center axis, the second electrode is entirely tilted away from the center axis after said providing of the capacitor element.

29. The method of claim 23,
wherein, in said tilting of the first electrode away from the center axis, the first electrode is entirely tilted away from the center axis after said providing of the capacitor element, and
wherein, in said tilting of the second electrode away from the center axis, the second electrode is entirely tilted away from the center axis after said providing of the capacitor element.

30. A method of manufacturing an electric double-layer capacitor, the method comprising:
providing a capacitor element which includes
  a first collector made of metal foil wound around a center axis,
  a first polarizable electrode layer wound around the center axis and provided on the first collector in a direction toward the center axis,
  a first separator wound around the center axis and provided on the first polarizable electrode layer in the direction toward the center axis,
  a second collector made of metal foil wound around the center axis and provided on the first separator in the direction toward the center axis,
  a second polarizable electrode layer wound around the center axis and provided on the second collector in the direction toward the center axis,
  a second separator wound around the center axis and provided on the second polarizable electrode layer in the direction toward the center axis,
  a first electrode extending from the first collector and parallel to the center axis and having a spiral shape extending continuously around the center axis, and
  a second electrode extending from the second collector in a direction opposite to the first electrode and parallel to the center axis, the second electrode having a spiral shape extending continuously around the center axis, wherein the capacitor element has a first end surface and a second end surface opposite to each other in a direction of the center axis, and an outer surface that faces the side surface of the case and is parallel to the center axis;
tilting an inner portion of the first electrode away from the center axis, wherein the capacitor element includes an outer surface that faces the side surface of the case and is parallel to the center axis; and
tilting an outer portion of the first electrode towards the center axis, the outer portion being positioned farther from the center axis than the inner portion and connected to the outer surface of the capacitor element;
accommodating the capacitor element in a cylindrical case having a bottom, a side surface, and an opening after said tilting of the inner portion of the first electrode and after said tilting of the outer portion of the first electrode;
joining the second electrode to the bottom of the case after said accommodating of the capacitor element in the case;
accommodating a driving electrolyte in the case; and
joining a terminal plate to the first electrode of the capacitor element while providing the terminal plate at the opening of the case.

31. A method of manufacturing an electric double-layer capacitor, the method comprising:
providing a capacitor element which includes
  a first collector made of metal foil wound around a center axis,
  a first polarizable electrode layer wound around the center axis and provided on the first collector in a direction toward the center axis,
  a first separator wound around the center axis and provided on the first polarizable electrode layer in the direction toward the center axis,
  a second collector made of metal foil wound around the center axis and provided on the first separator in the direction toward the center axis,
  a second polarizable electrode layer wound around the center axis and provided on the second collector in the direction toward the center axis,
  a second separator wound around the center axis and provided on the second polarizable electrode layer in the direction toward the center axis,
  a first electrode extending from the first collector and parallel to the center axis, and
  a second electrode extending from the second collector in a direction opposite to the first electrode and parallel to the center axis wherein the capacitor element has a first end surface and a second end surface opposite to each other in a direction of the center axis, and an outer surface that faces the side surface of the case and is parallel to the center axis;

tilting the first electrode away from the center axis after said providing of the capacitor element;

tilting the second electrode away from the center axis after said providing of the capacitor element;

accommodating the capacitor element in a cylindrical case having a bottom, a side surface, and an opening after said tilting of the first electrode and after said tilting of the second electrode;

joining the second electrode to the bottom of the case after said accommodating of the capacitor element in the case;

accommodating a driving electrolyte in the case; and joining a terminal plate to the first electrode of the capacitor element while providing the terminal plate at the opening of the case, wherein the capacitor element has a hollow portion that extends along the center axis and is connected to the first end surface and the second end surface, and said tilting of the first electrode comprises:
- allowing a processing device to contact the first electrode in a predetermined direction from the center axis and in the hollow portion while the capacitor element is rotated about the center axis in a winding direction of the first collector; and
- after said allowing the processing device to contact the first electrode, moving the processing device in a direction perpendicular to the predetermined direction while contacting the first electrode while the capacitor element is rotated about the center axis in the winding direction of the first collector.

32. A method of manufacturing an electric double-layer capacitor, the method comprising:

providing a capacitor element which includes
- a first collector made of metal foil wound around a center axis,
- a first polarizable electrode layer wound around the center axis and provided on the first collector in a direction toward the center axis,
- a first separator wound around the center axis and provided on the first polarizable electrode layer in the direction toward the center axis,
- a second collector made of metal foil wound around the center axis and provided on the first separator in the direction toward the center axis,
- a second polarizable electrode layer wound around the center axis and provided on the second collector in the direction toward the center axis,
- a second separator wound around the center axis and provided on the second polarizable electrode layer in the direction toward the center axis,
- a first electrode extending from the first collector and parallel to the center axis, and
- a second electrode extending from the second collector in a direction opposite to the first electrode and parallel to the center axis wherein the capacitor element has a first end surface and a second end surface opposite to each other in a direction of the center axis, and an outer surface that faces the side surface of the case and is parallel to the center axis;

tilting the first electrode away from the center axis after said providing of the capacitor element;

tilting the second electrode away from the center axis after said providing of the capacitor element;

accommodating the capacitor element in a cylindrical case having a bottom, a side surface, and an opening after said tilting of the first electrode and after said tilting of the second electrode;

joining the second electrode to the bottom of the case after said accommodating of the capacitor element in the case;

accommodating a driving electrolyte in the case; and joining a terminal plate to the first electrode of the capacitor element while providing the terminal plate at the opening of the case, wherein the capacitor element has a hollow portion that extends along the center axis and is connected to the first end surface and the second end surface, and said tilting of the second electrode comprises:
- allowing a processing device to contact the second electrode in a predetermined direction from the center axis and in the hollow portion, while the capacitor element is rotated about the center axis in a winding direction of the first collector; and
- after said allowing the processing device to contact the second electrode, moving the processing device in a direction perpendicular to the predetermined direction while contacting the second electrode while the capacitor element is rotated about the center axis in the winding direction of the first collector.

* * * * *